B. K. MOSCOPOULOS.

SPONGE GATHERING NET.

No. 10,688. Reissued Feb. 16, 1886.

Attest:
John A. Ellis
A. B. Moore.

Inventor:
Basilios K. Moscopoulos
By David A. Burr
Atty.

N. PETERS, Photo-Lithographer, Washington, D. C.

UNITED STATES PATENT OFFICE.

BASILIOS K. MOSCOPOULOS, OF NEW YORK, N. Y.

SPONGE-GATHERING NET.

SPECIFICATION forming part of Reissued Letters Patent No. 10,688, dated February 16, 1886.

Original No. 314,047, dated March 17, 1885. Application for reissue filed June 6, 1885. Serial No. 167,899.

*To all whom it may concern:*

Be it known that I, BASILIOS K. MOSCOPOULOS, a citizen of the United States of America, residing in the city, county, and State of New York, have invented a certain new and useful Improvement in Sponge-Gathering Nets; and I do hereby declare that the following is a full and exact description thereof, reference being had to the accompanying drawings, and to the letters of reference marked thereon, making a part of this specification.

The object of this invention is to produce a net adapted especially to the purpose of fishing sponges; and it consists in a net of bag shape having attached to the mouth thereof a frame, one portion of which is composed of metal or other heavy material, and the remainder of wood or other buoyant material, so that when the net is cast into the water the heavy portion of the frame acts as a sinker, while the buoyant portion thereof has a tendency to float, whereby the mouth of the net is kept open for the reception of the sponges or other objects or substances.

It consists, also, in constructing the frame with detachable end pieces, so that it may be easily taken apart for transportation and repair, the lower ends of these end pieces being formed so that they shall support the heavy lower bar far enough above the bottom over which it is dragged to clear the small sponges, and fitted, when the nets are heavy, with rollers, to facilitate dragging the net.

It consists, also, in the combination, with the upper bar of the frame, of a gate or valve hinged thereto to swing freely inward and permit the ready passage of the sponges into the net, and to close automatically outward against the frame, to prevent their return.

Figure 1:
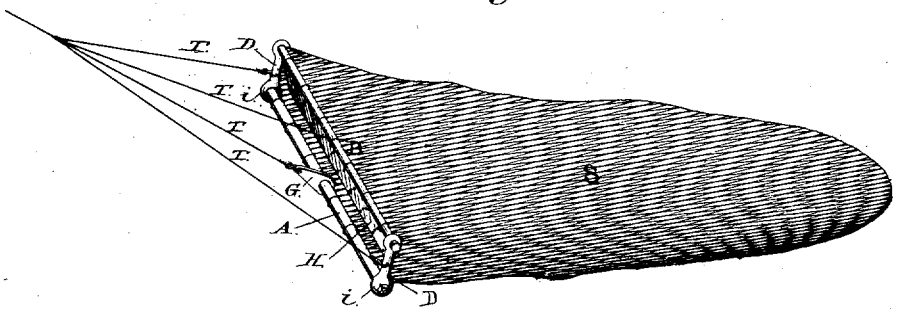
Figure 2:
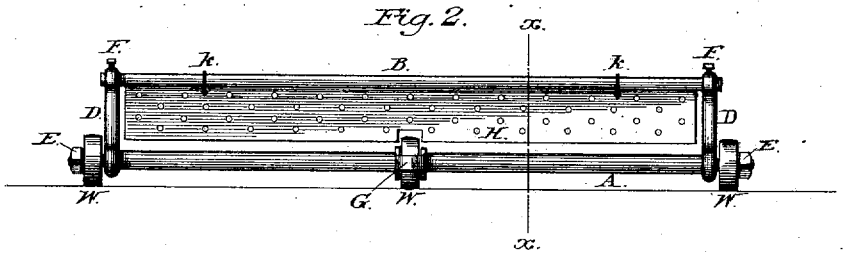

In the accompanying drawings, Figure 1 is a view in perspective of my improved sponge-gathering net with its gate partly swung open; Fig. 2, a front elevation of the frame, illustrating the same when provided with rollers, and with the gate partly open, and Fig. 3 a transverse section in line *x x* of Fig. 2.

A represents the bottom bar of the frame, made of metal or very heavy wood, so that it will sink very readily to the bottom, upon which the sponges grow.

B is its upper bar, made of light wood or of a light, hollow, hermetically-sealed tube, sufficiently buoyant to float in the water over the bottom bar, A, to which it is attached at each end.

D D are detachable end pieces adapted to fit easily upon the ends of the upper and lower bars, B A, of the frame and connect them together. These end pieces are preferably made to embrace the ends of said bars, and may be made fast thereon by a nut, E, screwing upon the end of the bar, or by a screw or pin, F, passing transversely through the end piece into the bar. In either case the end pieces admit of being readily removed and the whole frame taken apart for convenience in transportation and use in a small boat or vessel, and to permit of the repair or renewal of any member of the frame which may be broken or damaged.

The lower portion, *i*, of each end piece is by preference made circular in form, and is so enlarged in diameter as that its periphery will project radially from the bar A, which it embraces, and rest upon the bottom of the lagoon or sheet of water in which the sponges are found, so that the bar will be thereby uplifted and supported above the bottom far enough to clear the young sponges thereon.

A ring, staple, or clevis, G, is fitted centrally upon the bar A, and the diameter thereof is made to correspond with that of the lower ends, *i*, of the end pieces, D D, (see Fig. 1,) so as to afford a corresponding support for the middle of the bar.

A net, S, which may be of any suitable material—such as linen or cotton thread, or leather strips—and which is closed to form a bag, is attached at its open end to the frame A B D D in the customary manner, so that the frame will constitute the mouth of the net or bag.

A gate or valve, H, of any suitable description—as, for instance, of light perforated sheet metal, or of wire-netting, or of a frame covered with a textile netting or fabric—is suspended loosely by rings *k k* from the upper bar, B, of the frame, or is otherwise loosely hinged thereto so as to swing freely inside of the frame. It is so arranged as that while it is free to swing inwardly from the frame, as shown in the drawings, it may not swing outwardly; but is arrested in its outward movement by contact with the frame or a stop projecting therefrom.

Instead of closing the mouth of the net or bag with a single gate extending from end to end of the frame, I contemplate dividing the gate into two or more sections, each constructed substantially as the single gate described.

The net is thrown and dragged by means of a sling of ropes, T T, which are attached to the center and ends of the frame, as shown in Fig. 1.

When the net is thrown into the water, the heavy bar A will sink to the bottom, while the buoyant upper bar, B, by reason of its tendency to float, will keep the frame or mouth of the net open in a vertical position, so that the sponges which it meets as it is drawn forward will necessarily be carried into the net. The gate or valve H, which opens readily inward to allow the admission of the sponges, will close automatically to prevent their return. The projecting lower ends, *i i*, of the end pieces, D D, carry the bar A far enough above the bottom during its movement so that it will pass over all small objects thereon, and thus avoid injury to the sponges which are too small to be of value.

Figure 3:
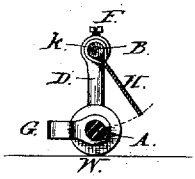

To facilitate the passage of the frame and net over the small young sponges and the prevention of injury thereto, especially when the net is large and heavy, or when a small boat is used to drag it, rollers W W W are fitted upon the ends of the bottom bar, A, and in its central clevis, G, as shown in Figs. 2 and 3, which operate not only to elevate the bar above the bottom to clear the young sponges, but also to facilitate the movement of the bar.

I claim as my invention—

1. A net of bag shape for fishing sponges or the like, having attached to the mouth thereof a frame, one portion of which is composed of metal or other weighty material, and the remainder of wood or other buoyant material, substantially as and for the purpose described.

2. The combination, with the heavy lower bar and buoyant upper bar of the frame of a sponge-gathering net, of detachable end pieces embracing and connecting said bars at each end thereof and made fast thereto by detachable fastenings, substantially in the manner and for the purpose herein set forth.

3. The combination, with the frame of a sponge-gathering net, of an inwardly-opening valve or gate hinged loosely to the upper bar of said frame, substantially in the manner and for the purpose herein set forth.

BASILIOS K. MOSCOPOULOS.

Witnesses:

J. F. ACKER, Jr.,
A. B. MOORE.